(12) United States Patent
Kim

(10) Patent No.: US 12,379,074 B2
(45) Date of Patent: Aug. 5, 2025

(54) PRESSURE VESSEL AND METHOD OF MANUFACTURING PRESSURE VESSEL

(71) Applicants: HYUNDAI MOTOR COMPANY, Seoul (KR); KIA CORPORATION, Seoul (KR)

(72) Inventor: Cheol Hwan Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 2 days.

(21) Appl. No.: 18/195,674

(22) Filed: May 10, 2023

(65) Prior Publication Data

US 2024/0200729 A1      Jun. 20, 2024

(30) Foreign Application Priority Data

Dec. 16, 2022 (KR) .................. 10-2022-0177521

(51) Int. Cl.
*F17C 13/06* (2006.01)
*B05B 1/06* (2006.01)

(52) U.S. Cl.
CPC ............. *F17C 13/06* (2013.01); *B05B 1/06* (2013.01); *F17C 2203/0663* (2013.01); *F17C 2205/0352* (2013.01); *F17C 2209/234* (2013.01)

(58) Field of Classification Search
CPC ............. F17C 13/06; F17C 2203/0663; F17C 2205/0352; F17C 2209/234; F17C 1/06; F17C 1/16; F17C 1/02; F17C 2209/00; F17C 2201/0138; F17C 2205/037; F17C 2205/0305; B05B 1/06; Y02E 60/32; F16L 33/2076; F16L 13/14; F16L 13/141

USPC ................................ 220/560.04
See application file for complete search history.

(56) References Cited

U.S. PATENT DOCUMENTS

| 4,142,554 | A | 3/1979 | Washkewicz et al. |
| 5,358,012 | A | 10/1994 | Kish |
| 10,066,765 | B2 | 9/2018 | Jaspaert |
| 2011/0272943 | A1 | 11/2011 | Baldwin et al. |
| 2015/0362130 | A1* | 12/2015 | Lanzl ............... H01M 8/04104 429/446 |
| 2018/0224036 | A1 | 8/2018 | Ramaswamy |
| 2020/0200328 | A1* | 6/2020 | Yeggy ....................... F17C 1/16 |

(Continued)

FOREIGN PATENT DOCUMENTS

| DE | 102022120613 A1 * | 2/2023 | ............. B29C 70/68 |
| EP | 1300621 A1 | 4/2003 | |

(Continued)

OTHER PUBLICATIONS

English Machine Translation of DE-102022120613-A1 (Year: 2023).*

*Primary Examiner* — Don M Anderson
*Assistant Examiner* — Laura E. Parker
(74) *Attorney, Agent, or Firm* — MCDONNELL BOEHNEN HULBERT & BERGHOFF LLP

(57) ABSTRACT

A pressure vessel includes a vessel part including a liner and a fiber-reinforced layer formed to surround an outer surface of the liner, and a nozzle part provided at an end of the vessel part, wherein the nozzle part includes a nipple having at least a portion inserted into the liner, and an inner sleeve inserted between the outer surface of the liner and an inner surface of the fiber-reinforced layer and having a flow path groove formed to extend in an extension direction of the liner.

15 Claims, 27 Drawing Sheets

(56) References Cited

U.S. PATENT DOCUMENTS

2022/0356991 A1* 11/2022 Wexler ...................... F17C 1/16
2024/0084967 A1* 3/2024 Lee .......................... F17C 1/16

FOREIGN PATENT DOCUMENTS

| JP | 2009-180312 A | 8/2009 |
| JP | 6010831 B2 | 10/2016 |
| KR | 20-0478049 Y1 | 8/2015 |

* cited by examiner

PRESSURE VESSEL AND METHOD OF MANUFACTURING PRESSURE VESSEL

CROSS REFERENCE TO RELATED APPLICATIONS

This application claims the benefit of priority to Korean Patent Application No. 10-2022-0177521, filed in the Korean Intellectual Property Office on Dec. 16, 2022, the entire contents of which are incorporated herein by reference.

TECHNICAL FIELD

The present disclosure relates to a pressure vessel and a method of manufacturing a pressure vessel, and more particularly, to a pressure vessel having an improved structural function and improved manufacturing process efficiency, and a method of manufacturing a pressure vessel.

BACKGROUND

Hydrogen vehicles are configured to generate electricity by themselves through a chemical reaction between hydrogen and oxygen and travel by driving motors. In detail, the hydrogen vehicle includes a hydrogen tank in which hydrogen is stored, a fuel cell stack that produces electricity through an oxidation-reduction reaction of hydrogen and oxygen, various devices that drain generated water, a battery that stores the electricity produced by the fuel cell stack, a controller that converts and controls the produced electricity, a motor that generates a driving force, and the like.

A pressure vessel that may withstand a high pressure to store a high-pressure fuel may be used as the hydrogen tank of the hydrogen vehicle. Examples of the pressure vessel include a cylindrical vessel having a large diameter, a curved pipe vessel in which a plurality of vessels having a large slenderness ratio are connected through a bent pipe, and the like.

A nozzle part including a nipple and a sleeve is coupled to an end of the pressure vessel. The nipple is inserted into a tube, and the sleeve is plastically deformed through a swaging process or the like and is closely mounted on the outside of the tube. Further, a protrusion for preventing the sleeve from being separated from the tube is formed in the sleeve.

The curved pipe vessel may be manufactured by forming a reinforced fiber layer on an outer surface of the tube generally manufactured of a polymer, impregnating the reinforced fiber layer with a polymer resin, and then curing the impregnated reinforced fiber layer. The reinforced fiber layer serves as a base material, and only when a portion between reinforced fibers is sufficiently impregnated with a resin and is then cured, the nozzle part may secure a resistance to a load applied to the pressure vessel, and accordingly, may secure structural performance.

In the case of a general cylindrical vessel, a helical layer is formed or a doom part is formed in the nozzle part, and thus a resistance to the load of the nozzle part may be secured. However, in the curved pipe vessel, since a nozzle is small and the dome part is not formed in the nozzle part, it is difficult to secure the resistance of the nozzle part by the helical layer. Thus, in the case of the curved pipe vessel, in particular, only when the reinforced fiber layer is sufficiently impregnated with the resin, the structural performance is advantageously secured.

However, when the sleeve is mounted by the swaging method, a flow path of the resin is blocked by the protrusion formed on the sleeve, and thus a portion not impregnated with the resin may occur in the reinforced fiber layer in which the nozzle part is installed. When the reinforced fibers are not impregnated or not sufficiently impregnated with the resin, a load is not transferred between the reinforced fibers, and thus, structural performance is greatly degraded.

Thus, improvement of a technology capable of securing the structural performance by smoothing impregnating a nozzle part connection portion of the pressure vessel with the resin is required.

SUMMARY

The present disclosure has been made to solve the above-mentioned problems occurring in the prior art while advantages achieved by the prior art are maintained intact.

An aspect of the present disclosure provides a pressure vessel having improved structural performance because the impregnation of a fiber-reinforced layer with a resin increases, and a method of manufacturing a pressure vessel.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided a pressure vessel including a vessel part including a liner and a fiber-reinforced layer formed to surround an outer surface of the liner, and a nozzle part provided at an end of the vessel part, wherein the nozzle part includes a nipple having at least a portion inserted into the liner, and an inner sleeve inserted between the outer surface of the liner and an inner surface of the fiber-reinforced layer and having a flow path groove formed to extend in an extension direction of the liner.

The liner may include a sleeve fixing groove concavely formed on the outer surface thereof, and the inner sleeve may include a sleeve protrusion protruding from an inner surface thereof and inserted into the sleeve fixing groove.

When a direction toward an end to which the nozzle part is connected is referred to as a first direction and a direction opposite to the first direction is referred to as a second direction, among an extension direction of the vessel part, the nipple may include an insertion fitting part inserted into the vessel part, and a pipe connection part extending from the insertion fitting part in the first direction and provided to protrude from the end of the vessel part.

The liner may include a nipple fixing groove concavely formed on an inner surface thereof, and the insertion fitting part may include a nipple protrusion protruding to be inserted into the nipple fixing groove on an outer surface thereof.

The insertion fitting part may include a coupling protrusion part protruding from an outer surface of an end thereof in the first direction, and the inner sleeve may include an inner coupling step coupled to the coupling protrusion part.

The pipe connection part may have an inner screw thread formed on an inner circumferential surface thereof and an outer screw thread formed on an outer circumferential surface thereof.

The nozzle part may further include a reinforcement ring screw-coupled to an end of the nipple in the first direction, and an outer sleeve provided to surround an outer surface of the fiber-reinforced layer and coupled to an outer surface of the reinforcement ring.

The reinforcement ring may include a sleeve coupling groove concavely formed on an outer circumferential surface thereof, and the outer sleeve may include an outer coupling step protruding to be inserted into the sleeve coupling groove at an end thereof in the first direction.

The outer sleeve may include a plurality of fixing protrusions protruding from an inner surface thereof to be fixed to the fiber-reinforced layer, and a fluid hole through which a fluid flowing in the fiber-reinforced layer is introduced or discharged and which is formed to communicate with the flow path groove.

The plurality of fixing protrusions may include a first group of fixing protrusions arranged in the extension direction of the liner, and the first group of the fixing protrusions may be arranged spaced apart from each other in a circumferential direction of the outer sleeve.

A resin movement flow path is provided between the first group of fixing protrusions adjacent to each other, and the resin movement flow path and the flow path groove may be alternately positioned in the circumferential direction of the outer sleeve.

When a direction toward an end to which the nozzle part is connected is referred to as a first direction and a direction opposite to the first direction is referred to as a second direction, among an extension direction of the vessel part, the flow path groove may pass through an inner surface and an outer surface of the inner sleeve and may be open at an end of the inner sleeve in the second direction.

The nozzle part may further include a sealing member that seals a gap between the nipple and the liner, the nipple may include an insertion fitting part inserted into the vessel part, and a pipe connection part provided to extend from the insertion fitting part in the first direction and protrude from the end of the vessel part, the insertion fitting part may include a swaging area that is an area corresponding to the inner sleeve and a non-swaging area that is other than the swaging area and is provided in the second direction of the swaging area, and a sealing mounting groove into which the sealing member is inserted may be formed in the non-swaging area.

When a direction toward an end to which the nozzle part is connected is referred to as a first direction and a direction opposite to the first direction is referred to as a second direction, among an extension direction of the vessel part, the flow path groove may pass through an inner surface and an outer surface of the inner sleeve, and a tip portion that is an end of the inner sleeve in the second direction may be continuously formed in a circumferential direction to close an end of the flow path groove in the second direction.

The nozzle part may further include an outer sleeve provided to surround an outer surface of the fiber-reinforced layer, an end of the inner sleeve may extend further than an end of the outer sleeve in the second direction, and the end of the flow path groove in the second direction may be located at a position further in the second direction than the end of the outer sleeve in the second direction.

The nozzle part may further include a sealing member that seals a gap between the nipple and the liner, and the sealing member may be provided at a position corresponding to an end of the liner in the first direction.

The sealing member may be provided at a position corresponding to an end of the outer sleeve in the first direction.

The fluid hole may have a screw thread formed on an inner circumferential surface thereof.

The nozzle part may further include a surface treatment layer, which is surface-treated, on an outer surface of the inner sleeve and an inner surface of the outer sleeve to improve an adhesive force for the fluid impregnated in the fiber-reinforced layer.

The nozzle part may further include a reinforcement sleeve formed to surround the outer surfaces of the outer sleeve and the fiber-reinforced layer.

According to another aspect of the present disclosure, there is provided a method of manufacturing a pressure vessel, the method including a nipple mounting operation of inserting a nipple into a liner, an inner sleeve fixing operation of fixing an inner sleeve to an outer surface of the liner by a swaging process, a hold pressure application operation of applying a hold pressure to an inside of the liner, a fiber-reinforced layer formation operation of forming a fiber-reinforced layer by braiding a reinforced fiber to the outer surface of the liner in a state in which the hold pressure is applied to the inside of the liner, a resin impregnation operation of impregnating the fiber-reinforced layer with a resin, and a curing operation of curing the impregnated resin, wherein, in the resin impregnation operation, at least a portion of the impregnated resin is provided to move in an extension direction of the liner through a flow path groove formed in the inner sleeve.

The method may further include, before the resin impregnation operation, a reinforce ring mounting operation of screw-coupling a reinforcement ring to an outer surface of the nipple, and an outer sleeve fixing operation of fixing an outer sleeve to an outer surface of the fiber-reinforced layer and an outer surface of the reinforcement ring.

In the resin impregnation operation, the resin flowing in the fiber-reinforced layer may be discharged through a fluid hole formed in the outer sleeve.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments suitable for understanding technical features of a pressure vessel and a method of manufacturing a pressure vessel according to the present disclosure. However, the present disclosure is not limited to the embodiments described below, the technical features of the present disclosure are not limited by the described embodiments, and various modifications may be made within the technical scope of the present disclosure.

Figure 1:
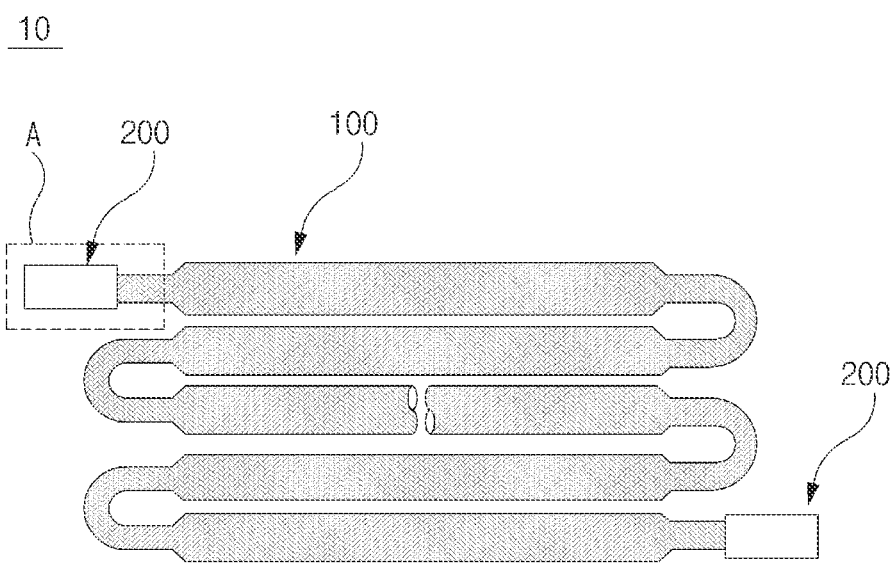
FIG. 1 is a view illustrating a pressure vessel according to a first embodiment of the present disclosure.
Figure 2:
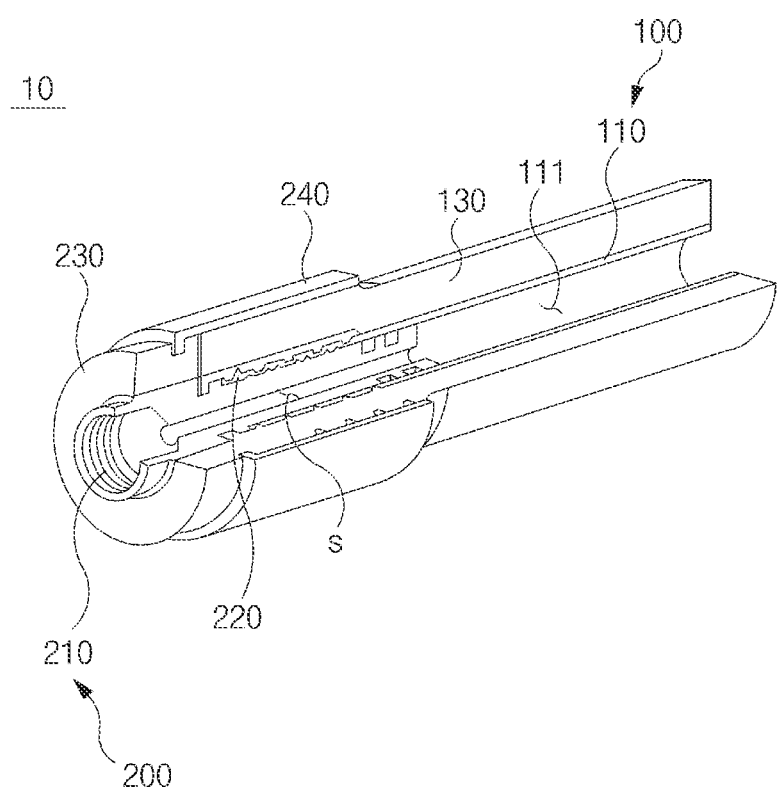
FIG. 2 is a cross-sectional perspective view illustrating the pressure vessel according to the first embodiment of the present disclosure and is a view illustrating part A of FIG. 1.
Figure 3:
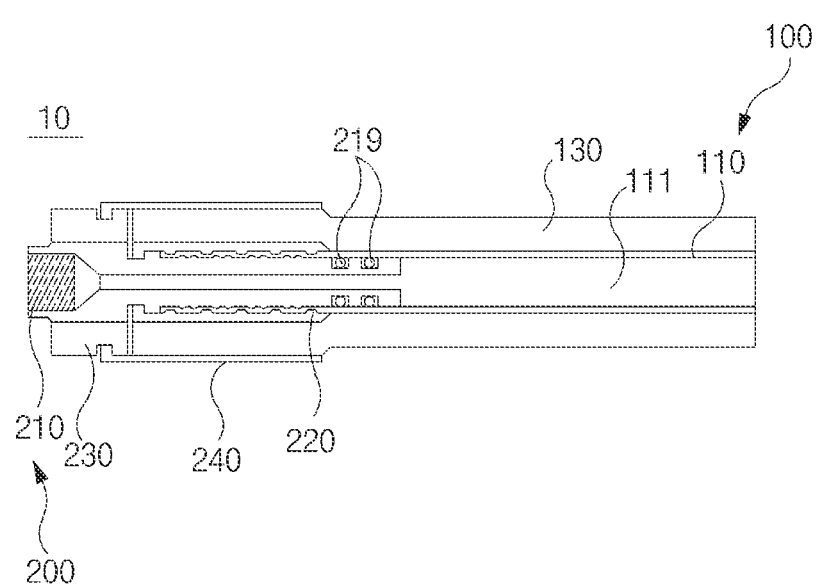
FIG. 3 is a cross-sectional view illustrating a longitudinal section of the pressure vessel according to the first embodiment of the present disclosure.
Figure 4:
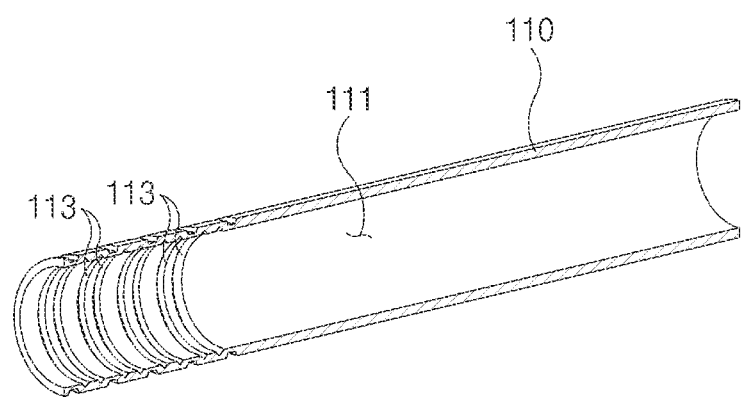
FIG. 4 is a cross-sectional perspective view illustrating an inner surface of a liner according to the first embodiment of the present disclosure.
Figure 5:
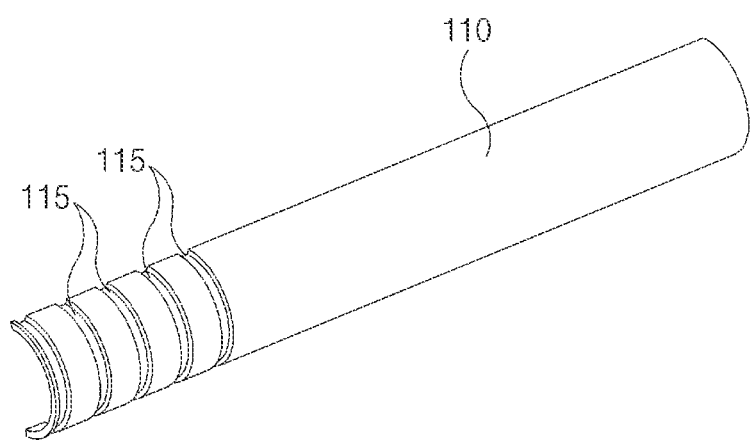
FIG. 5 is a cross-sectional perspective view illustrating an outer surface of the liner according to the first embodiment of the present disclosure.
Figure 6:
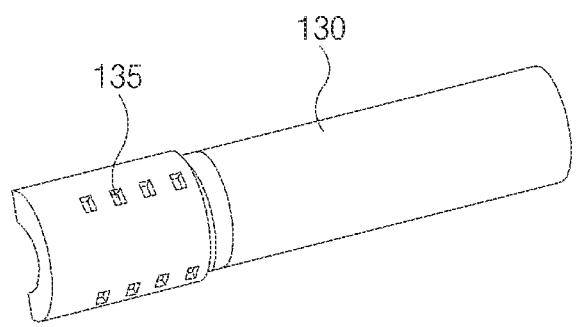
FIG. 6 is a cross-sectional perspective view illustrating an outer surface of a fiber-reinforced layer according to the first embodiment of the present disclosure.
Figure 7:
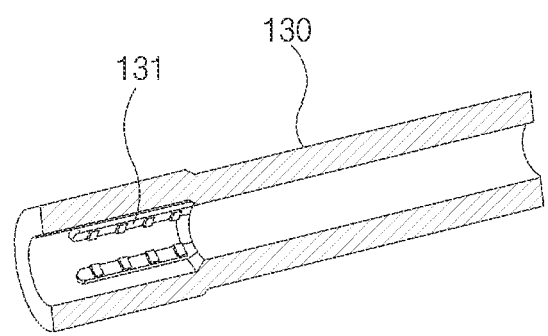
FIG. 7 is a cross-sectional perspective view illustrating an inner surface of the fiber-reinforced layer according to the first embodiment of the present disclosure.
Figure 8:
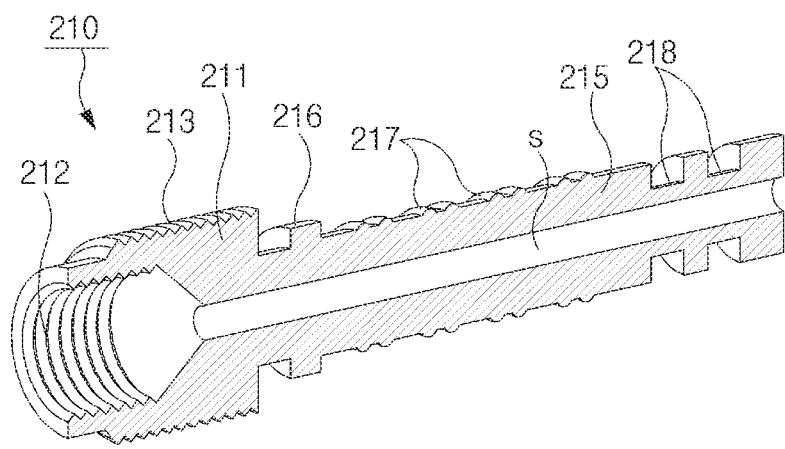
FIG. 8 is a cross-sectional perspective view illustrating an inner surface of a nipple according to the first embodiment of the present disclosure.
Figure 9:
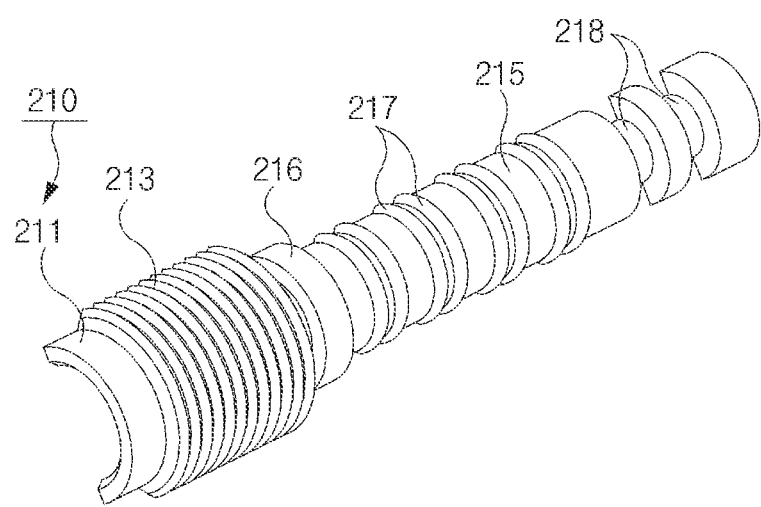
FIG. 9 is a cross-sectional perspective view illustrating an outer surface of the nipple according to the first embodiment of the present disclosure.
Figure 10:
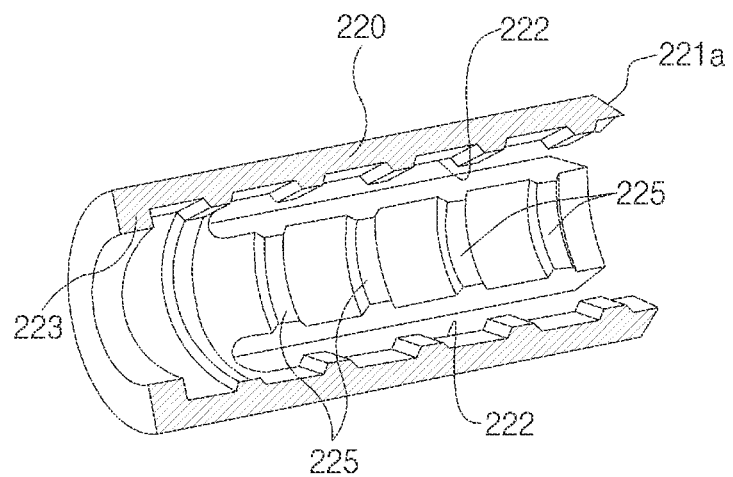
FIG. 10 is a cross-sectional perspective view illustrating an inner surface of an inner sleeve according to the first embodiment of the present disclosure.
Figure 11:
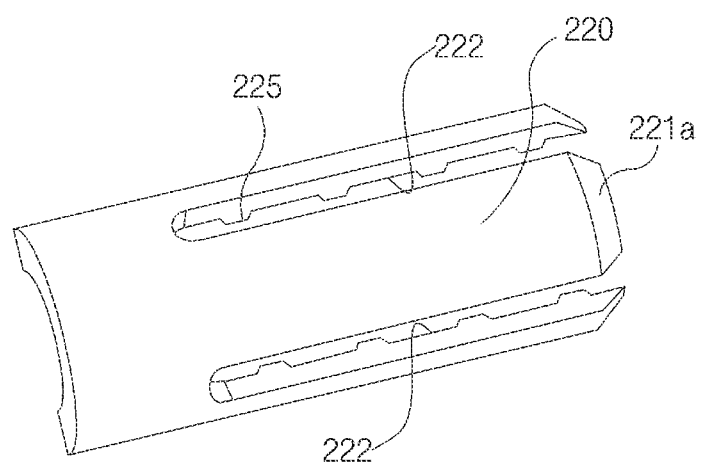
FIG. 11 is a cross-sectional perspective view illustrating an outer surface of the inner sleeve according to the first embodiment of the present disclosure.
Figure 12:
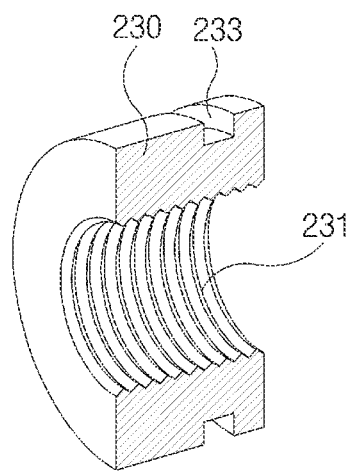
FIG. 12 is a cross-sectional perspective view illustrating an inner surface of a reinforcement ring according to the first embodiment of the present disclosure.
Figure 13:
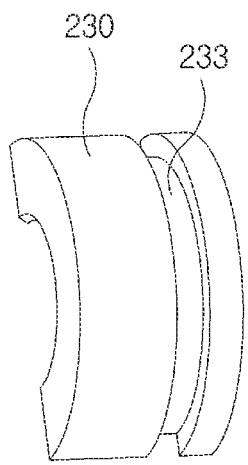
FIG. 13 is a cross-sectional perspective view illustrating an outer surface of the reinforcement ring according to the first embodiment of the present disclosure.
Figure 14:
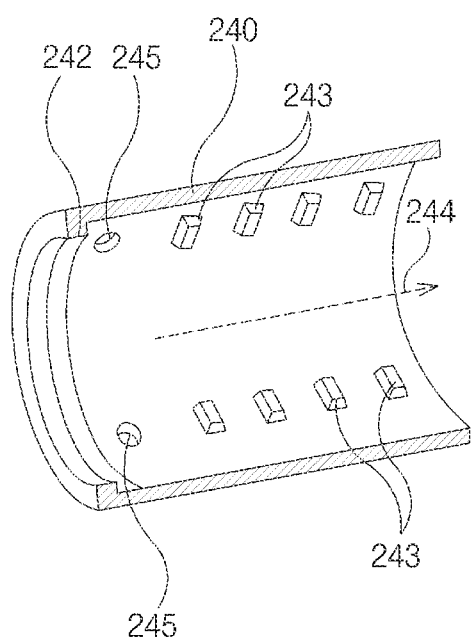
FIG. 14 is a cross-sectional perspective view illustrating an inner surface of an outer sleeve according to the first embodiment of the present disclosure.
Figure 15:
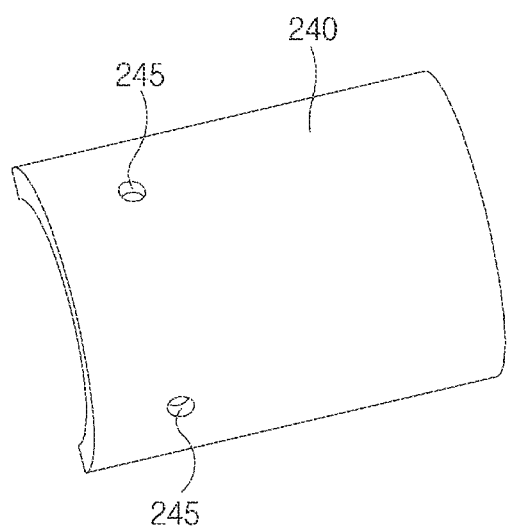
FIG. 15 is a cross-sectional perspective view illustrating an outer surface of the outer sleeve according to the first embodiment of the present disclosure.
Figure 16:
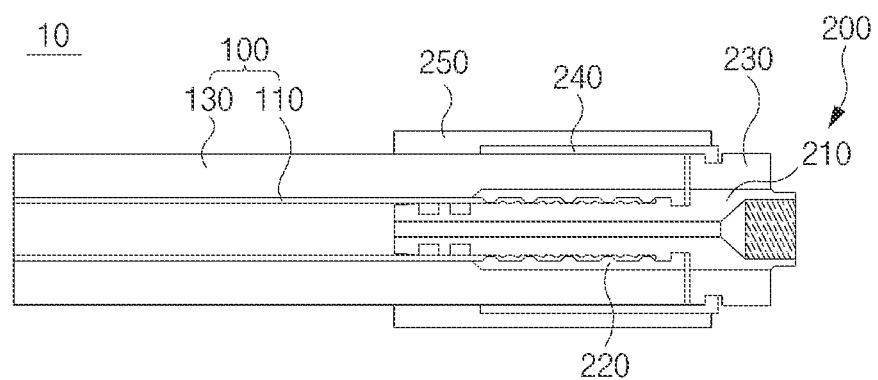
FIG. 16 is a cross-sectional view illustrating the pressure vessel provided with a reinforcement sleeve according to a modification of the first embodiment of the present disclosure.

FIG. 1 is a view illustrating a pressure vessel according to a first embodiment of the present disclosure, FIG. 2 is a cross-sectional perspective view illustrating the pressure vessel according to the first embodiment of the present disclosure and is a view illustrating part A of FIG. 1, FIG. 3 is a cross-sectional view illustrating a longitudinal section of the pressure vessel according to the first embodiment of the present disclosure, FIG. 4 is a cross-sectional perspective view illustrating an inner surface of a liner according to the first embodiment of the present disclosure, FIG. 5 is a cross-sectional perspective view illustrating an outer surface of the liner according to the first embodiment of the present disclosure, FIG. 6 is a cross-sectional perspective view illustrating an outer surface of a fiber-reinforced layer according to the first embodiment of the present disclosure, FIG. 7 is a cross-sectional perspective view illustrating an inner surface of the fiber-reinforced layer according to the first embodiment of the present disclosure, FIG. 8 is a cross-sectional perspective view illustrating an inner surface of a nipple according to the first embodiment of the present disclosure, FIG. 9 is a cross-sectional perspective view illustrating an outer surface of the nipple according to the first embodiment of the present disclosure, FIG. 10 is a cross-sectional perspective view illustrating an inner surface of an inner sleeve according to the first embodiment of the present disclosure, FIG. 11 is a cross-sectional perspective view illustrating an outer surface of the inner sleeve according to the first embodiment of the present disclosure, FIG. 12 is a cross-sectional perspective view illustrating an inner surface of a reinforcement ring according to the first embodiment of the present disclosure, FIG. 13 is a cross-sectional perspective view illustrating an outer surface of the reinforcement ring according to the first embodiment of the present disclosure, FIG. 14 is a cross-sectional perspective view illustrating an inner surface of an outer sleeve according to the first embodiment of the present disclosure, FIG. 15 is a cross-sectional perspective view illustrating an outer surface of the outer sleeve according to the first embodiment of the present disclosure, and FIG. 16 is a cross-sectional view illustrating the pressure vessel provided with a reinforcement sleeve according to a modification of the first embodiment of the present disclosure.

Figure 17:
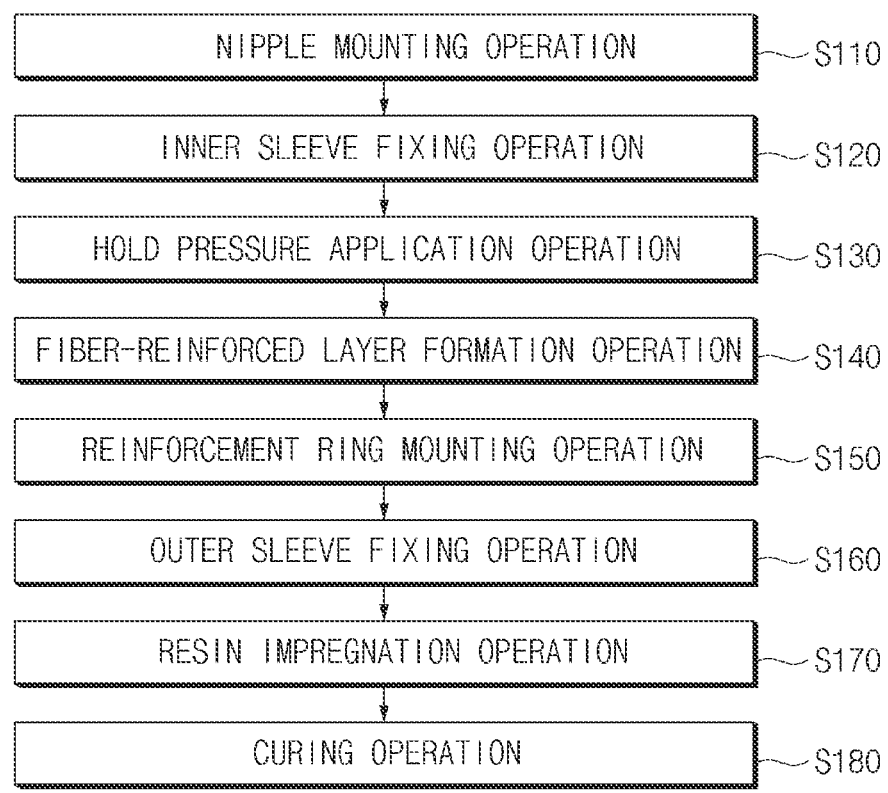
FIG. 17 is a flowchart illustrating a method of manufacturing the pressure vessel according to the first embodiment of the present disclosure.
Figure 18A:
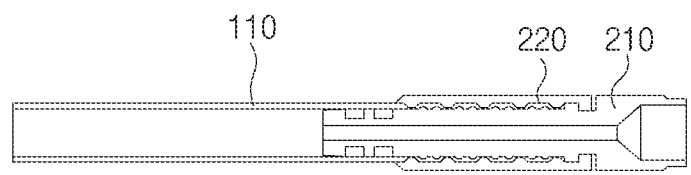
FIGS. 18A, 18B, 18C, and 18D are views illustrating a process of manufacturing the pressure vessel according to the first embodiment of the present disclosure.
Figure 18B:
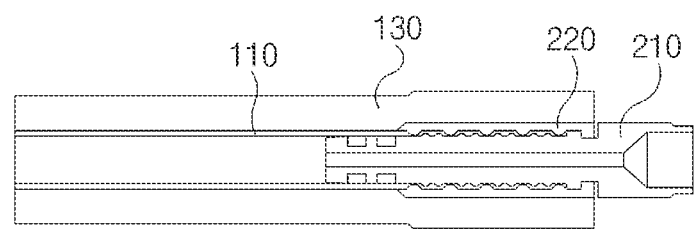
Figure 18C:
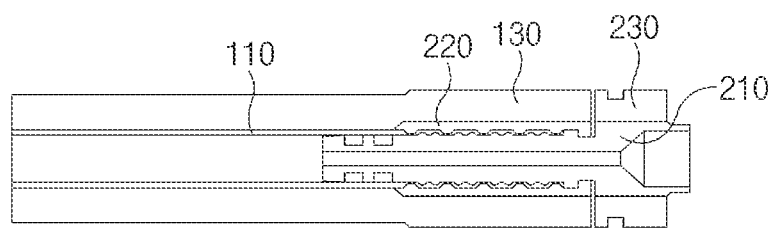
Figure 18D:
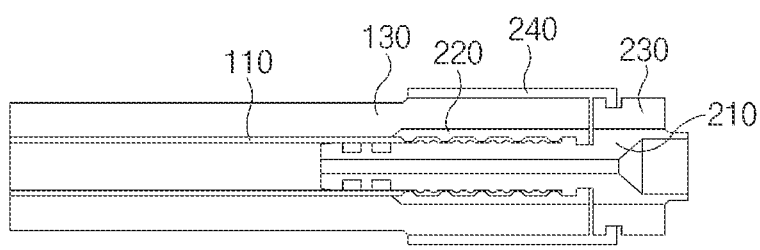
Figure 19:
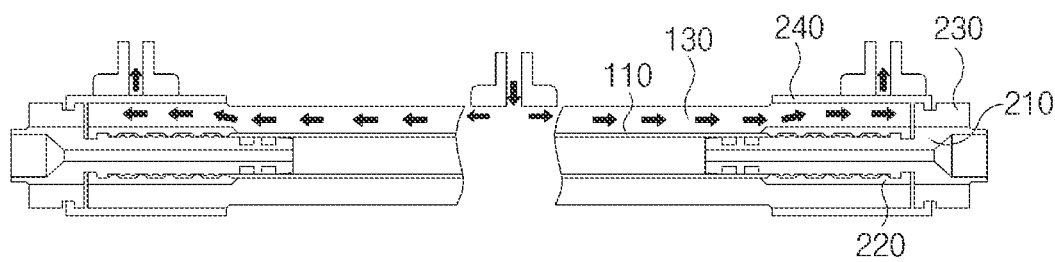
FIG. 19 is a view illustrating an example of movement of a resin in a resin impregnation operation of the method of manufacturing the pressure vessel according to the first embodiment of the present disclosure.
Figure 20:
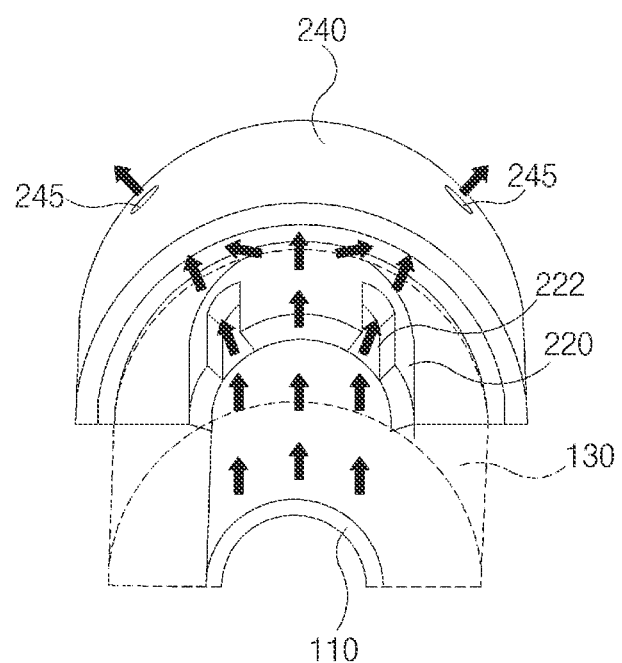
FIG. 20 is a view illustrating an example of movement of a resin in a resin impregnation operation of the method of manufacturing the pressure vessel according to the first embodiment of the present disclosure.
Figure 21:
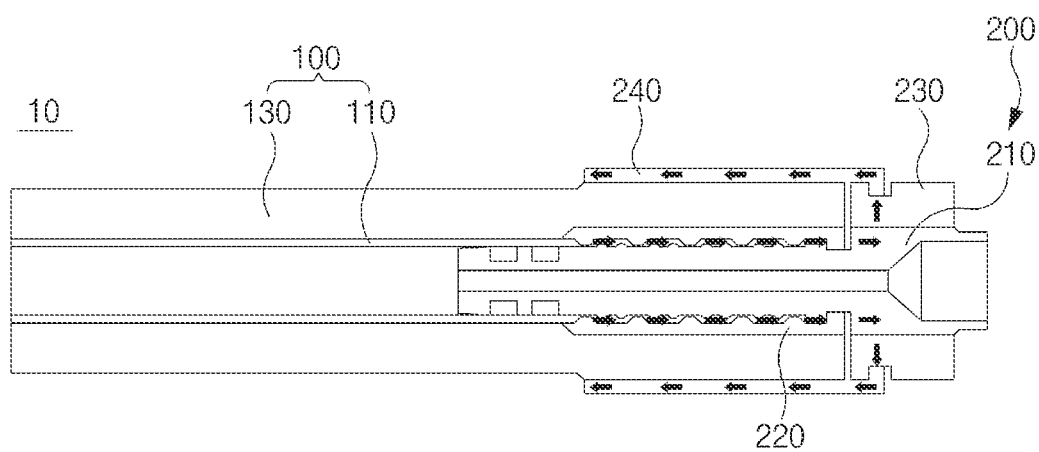
FIG. 21 is a view for describing a load transmission process of the pressure vessel according to the first embodiment of the present disclosure.

FIG. 17 is a flowchart illustrating a method of manufacturing the pressure vessel according to the first embodiment of the present disclosure, FIGS. 18A to 18D are views illustrating a process of manufacturing the pressure vessel according to the first embodiment of the present disclosure, FIG. 19 is a view illustrating an example of movement of a resin in a resin impregnation operation of the method of manufacturing the pressure vessel according to the first embodiment of the present disclosure, FIG. 20 is a view illustrating an example of movement of a resin in a resin impregnation operation of the method of manufacturing the pressure vessel according to the first embodiment of the present disclosure, and FIG. 21 is a view for describing a load transmission process of the pressure vessel according to the first embodiment of the present disclosure.

Referring to FIGS. 1 to 15, a pressure vessel 10 according to a first embodiment of the present disclosure includes a vessel part 100 including a liner 110 and a fiber-reinforced layer 130 formed to surround an outer surface of the liner 110 and a nozzle part 200 provided at an end of the vessel part 100. The nozzle part 200 includes a nipple 210 inserted into the liner 110 and an inner sleeve 220 inserted between the outer surface of the liner 110 and an inner surface of the fiber-reinforced layer 130 and having a flow path groove 222 extending in an extension direction of the liner 110.

The pressure vessel 10 according to the first embodiment of the present disclosure may be used to store a high-pressure fluid (liquid or gas), and the present disclosure is not restricted or limited by the types and characteristics of the fluid stored in the pressure vessel 10. Hereinafter, a case in which the pressure vessel 10 according to the first embodiment of the present disclosure is used as a hydrogen tank of a hydrogen storage system applied to a hydrogen vehicle will be described as an example.

The pressure vessel 10 according to the first embodiment of the present disclosure may include the vessel part 100 in which a high-pressure fluid is stored and the nozzle part 200 connected to both ends of the vessel part 100 to inject or discharge the fluid into or from the vessel part 100. Hereinafter, among extension directions of the vessel part 100, a direction toward an end to which the nozzle part 200 is connected is defined as a first direction, and a direction opposite to the first direction is defined as a second direction.

The vessel part 100 includes the liner 110 and the fiber-reinforced layer 130.

The liner 110 has a channel 111 formed therein through which the fluid may move, and has sections having different inner diameters. For example, in the liner 110, an inner diameter of an area in which a fuel is stored may be large and an inner diameter of a bent portion connecting the area in which the fuel is stored or an end portion at which the nozzle is mounted may be small (see FIG. 1). FIGS. 2 to 16 mainly illustrate an end portion (part A in FIG. 1) of the liner 110 on which the nozzle part 200 is mounted. The end portion of the liner 110, through which the fluid is injected or discharged, may be formed in a circular tube shape having a small diameter so that the nozzle part 200 may be easily mounted. The liner 110 may be manufactured of, for example, a polymer resin so as to be easily vent. However, the shape and material of the liner 110 are not limited thereto.

A nipple fixing groove 113 for fixing the nipple 210 may be formed on an inner surface of the liner 110, and a sleeve fixing groove 115 for fixing the inner sleeve 220 may be formed on the outer surface of the liner 110. The nipple 210 and the inner sleeve 220 are fixed to the liner 110 in a protrusion-and-groove structure, and thus the nipple 210 and the inner sleeve 220 may be prevented from being separated from the liner 110 due to an internal pressure of the liner 110.

Here, the nipple fixing groove 113 and the sleeve fixing groove 115 are not molded when the liner 110 is manufactured but may be formed by being deformed by protrusions formed on the nipple 210 and the inner sleeve 220. In detail, the nipple fixing groove 113 may be formed by being deformed by a nipple protrusion 217 formed on the nipple 210, and the sleeve fixing groove 115 may be formed by being deformed by a sleeve protrusion 225 formed on the inner sleeve 220. The nipple fixing groove 113 and the sleeve fixing groove 115 may be formed in the liner 110 by plastic deformation.

The fiber-reinforced layer 130 surrounds the outer surface of the liner 110. The fiber-reinforced layer 130 is a structural layer provided to resist a stress applied to the liner 110 and may be formed to entirely surround the outer surface of the liner 110.

The fiber-reinforced layer 130 may be manufactured, for example, by placing a reinforced fiber on an outer circumferential surface of the liner 110 through a braiding method, impregnating the reinforced fiber with a thermosetting resin, and then curing the reinforced fiber. A carbon fiber, a glass fiber, an aramid fiber, and the like may be used as the reinforced fiber. Further, a method of forming the reinforced fiber on the outer circumferential surface of the liner 110 is not limited to the braiding method, and as needed, a cross winding (pearl winding) method may be added to improve reinforcing performance in a circumferential direction.

For reference, reference numeral 135 in FIG. 6 denotes a fixed protrusion pressed by a fixing protrusion 243 of an outer sleeve 240, and reference numeral 131 in FIG. 7 denotes a flow path groove pressed by the flow groove 222 of the inner sleeve 220.

For example, a resin transfer molding (RTM) method may be used as a method of impregnating the fiber-reinforced layer 130 with the thermosetting resin. The RTM method is a method of molding a component using a composite material, and the RTM method is a method of manufacturing a preform that is a component made of a fiber in advance, mounting the preform on a mold, injecting a resin into the mold, and then curing the mold. In the present disclosure, after the outer surface of the liner 110 is formed to surround the reinforced fiber, the reinforced fiber may be impregnated with the resin and cured. In this case, the resin may be impregnated without a separate mold, and as needed, resin may be impregnated using a partial mold or the entire mold.

When the resin is impregnated, the resin may be impregnated while flowing from an injected portion to a discharged portion along an empty space inside the fiber-reinforced layer 130. In this case, an area of the fiber-reinforced layer 130 may be formed in a vacuum state, so that the injected resin may flow into a space between the reinforced fibers due to a differential pressure.

The outer sleeve 240 included in the nozzle part 200 applied to the first embodiment of the present disclosure may be fastened to the vessel part 100 by a swaging method. In this case, the outer sleeve 240 may be permanently deformed by a strong external force and pressed to the fiber-reinforced layer 130 due to the characteristics of the swaging method, the fiber-reinforced layer 130 at a portion in which the outer sleeve 240 is pressed may be pressed, and thus a flow path along which the resin flows may be narrowed. In this case, since the fluidity of the resin is lowered, the impregnability of the resin may be lowered. According to the first embodiment of the present disclosure, to prevent this problem, the nozzle part 200 having an advantageous structure for impregnating the fiber-reinforced layer 130 with the resin is provided.

The nozzle part 200 includes the nipple 210 and the inner sleeve 220. Further, the nozzle part 200 may further include a reinforcement ring 230 and the outer sleeve 240.

At least a portion of the nipple 210 is inserted into the liner 110.

In detail, the nipple 210 may serve as an inlet or outlet through which the fuel is injected into or discharged from an inside of the liner 110, and at the same time, may serve to secure airtightness of the fuel stored inside the vessel part 100. Further, the nipple 210 may serve to support a load of the liner 110 in an extension direction, which is generated by the internal pressure inside the liner 110. A fitting to which a pipe for injecting or discharging the fuel is connected may be connected to the nipple 210, and a hollow "s" communicating with the channel 111 of the liner 110 may be formed inside the nipple 210. For example, the nipple 210 may be made of a metal material, but the present disclosure is not limited thereto.

The nipple 210 may include an insertion fitting part 215 inserted into the vessel part 100 and a pipe connection part 211 provided to extend from the insertion fitting part 215 in the first direction and protrude from the end of the vessel part 100. That is, the nipple 210 may be divided into the insertion fitting part 215 that is a part inserted into the liner 110 and the pipe connection part 211 that is a part not inserted into the liner 110.

The liner 110 may include the nipple fixing groove 113 concavely formed on an inner surface thereof. Further, the insertion fitting part 215 may include the nipple protrusion 217 provided on an outer surface thereof and protruding to be inserted into the nipple fixing groove 113. As described above, the nipple fixing groove 113 may be formed by being plastically deformed by the nipple protrusion 217.

When the nipple 210 and the liner 110 are fitted with each other, the nipple protrusion 217 may be inserted into the nipple fixing groove 113, and accordingly, a coupling force between the nipple 210 and the liner 110 may increase. Accordingly, a resistance to the load in the extension direction, which is generated by the internal pressure of the liner 110 increases, and thus structural performance may be improved.

A plurality of nipple protrusions 217 and a plurality of nipple fixing grooves 113 may be formed spaced apart from each other in the extension direction of the liner 110. In this case, the number and the shape of the nipple protrusions 217 and the nipple fixing grooves 113 may be designed according to a level of the internal pressure of the liner 110.

The pipe connection part 211 may have an inner screw thread 212 formed on an inner circumferential surface thereof and an outer screw thread 213 formed on an outer circumferential surface. The pipe connection part 211 may be screw-coupled to the pipe or fitting through the inner screw thread 212 and screw-coupled to the reinforcement ring 230 through the outer screw thread 213. The load of the liner 110 may be transferred to the reinforcement ring 230 and the outer sleeve 240 through the pipe connection part 211 of the nipple 210.

Meanwhile, the inner sleeve 220 is a component for fixing the liner 110 and the nipple 210 and may be made of a metal material. The inner sleeve 220 may be pressed against the outer surface of the liner 110 by the swaging method. When the inner sleeve 220 is coupled to the outer surface of the liner 110 by the swaging method, the liner 110 and the nipple 210 are firmly fixed, and thus airtightness may be secured when a hold pressure is applied to the inside of the liner 110.

In detail, the inner sleeve 220 is provided with the flow path groove 222 interposed between the outer surface of the liner 110 and the inner surface of the fiber-reinforced layer 130 and extends in the extension direction of the liner 110. The inner sleeve 220 may smoothly move the fluid (resin) in the extension direction of the liner 110 through the flow path groove 222.

For example, the flow path groove 222 may pass through an inside and an outside of the inner sleeve 220 and may be open at end of the inner sleeve 220 in the second direction. Further, a plurality of the flow path grooves 222 may be spaced apart from each other in a circumferential direction of the inner sleeve 220.

Here, the shape, the size, and the number of the flow path grooves 222 may be differently designed depending on the impregnability (viscosity, and the like) of the resin with which the fiber-reinforced layer 130 is impregnated. A length of the flow path groove 222 may be set so that the entire area of the fiber-reinforced layer 130 to which the nozzle part 200 is connected may be impregnated with the resin. The shape of the flow path groove 222 may be changed due to permanent deformation of the inner sleeve 220 after swaging. Thus, when the flow path groove 222 of the inner sleeve 220 is designed, the shape of the flow path groove 222 after the swaging may be designed so that the flow path groove 222 functions as a flow path.

Further, for example, an end 221a of the inner sleeve 220 in the second direction may become sharper as it goes in the second direction. In detail, an outer surface of the end of the inner sleeve 220 may become closer to the liner 110 as it goes in the second direction. That is, an outer diameter of the end of the inner sleeve 220 may become smaller as it goes in the second direction.

Accordingly, occurrence of an air gap between the liner 110 and the fiber-reinforced layer 130 in an area adjacent to the end of the inner sleeve 220 may be minimized. Accordingly, a stress may be prevented from being concentrated on the fiber-reinforced layer 130 at the end of the inner sleeve 220, and thus damage to the fiber-reinforced layer 130 may be prevented. However, the shape of the inner sleeve 220 is not limited thereto.

The liner 110 may include the sleeve fixing groove 115 concavely formed on an outer surface thereof. Further, the inner sleeve 220 may include the sleeve protrusion 225 protruding from an inner surface thereof and inserted into the sleeve fixing groove 115. As described above, the sleeve fixing groove 115 may be plastically deformed by the sleeve protrusion 225.

For example, the sleeve protrusion 225 may protrude from an inner circumferential surface of the inner sleeve 220 in a ring shape. Further, a plurality of the sleeve protrusions 225 may be spaced apart from each other in an extension direction of the inner sleeve 220. When the inner sleeve 220 and the liner 110 are coupled, the sleeve protrusion 225 is inserted into the sleeve fixing groove 115, and thus a load applied in the extension direction of the liner 110 may be supported. The shape and number of the sleeve protrusions 225 formed on the inner sleeve 220 may be changed depending on a thickness or the internal pressure of the liner 110. Further, the sleeve protrusion 225 may be designed within a range in which the liner 110 is not damaged when the inner sleeve 220 is pressed against and coupled to the outer surface of the liner 110.

Meanwhile, the insertion fitting part 215 provided in the nipple 210 may include a coupling protrusion part 216 protruding from an outer surface of an end thereof in the first direction. Further, the inner sleeve 220 may include an inner coupling step 223 coupled to the coupling protrusion part 216.

When the inner sleeve 220 is coupled to the outer surface of the liner 110, the inner coupling step 223 of the inner sleeve 220 is coupled to the coupling protrusion part 216, and thus the inner sleeve 220 and the nipple 210 may be coupled to each other. Accordingly, the inner sleeve 220 may be firmly coupled to the liner 110 and the nipple 210, and accordingly, the nipple 210 and the liner 110 may be stably coupled to each other.

Meanwhile, the nozzle part 200 may further include a sealing member 219 that seals a gap between the nipple 210 and the liner 110. Here, the insertion fitting part 215 may include a swaging area that is an area corresponding to the inner sleeve 220 and a non-swaging area that is an area other than the swaging area and is provided in the second direction of the swaging area. Further, a sealing mounting groove 218 into which the sealing member 219 is inserted may be formed in the non-swaging area.

In other words, the insertion fitting part 215 of the nipple 210 inserted into the hollow 111 of the liner 110 may be divided into the swaging area that is an area corresponding to the inner sleeve 220 and the non-swaging area that does not correspond to the inner sleeve 220. The swaging area of the insertion fitting part 215 is indirectly pressed and deformed by means of the liner 110.

Thus, the sealing mounting groove 218, on which the sealing member 219 is mounted, is disposed to avoid the swaging area, and thus the performance of the sealing member 219 requiring precise design and precise machining may be secured.

Meanwhile, the nozzle part 200 according to the first embodiment of the present disclosure may further include the reinforcement ring 230 and the outer sleeve 240.

The reinforcement ring 230 may be screw-coupled to an outer surface of an end of the nipple 210 in the first direction. The reinforcement ring 230 is a component serving to connect the nipple 210 and the outer sleeve 240 and may be coupled to an outer surface of the pipe connection part 211 of the nipple 210. In detail, a screw thread 231 may be formed on an inner circumferential surface of the reinforcement ring 230, and thus may be screw-coupled to the outer screw thread 213 of the pipe connection part 211.

For example, although not illustrated, as needed, a resin injection hole for impregnating the fiber-reinforced layer 130 with the resin or a resin discharge hole for discharging the resin to the outside may be formed in the reinforcement ring 230 so as to provide a resin impregnation path.

The outer sleeve 240 may surround an outer surface of the fiber-reinforced layer 130 and coupled to an outer surface of the reinforcement ring 230.

In detail, the outer sleeve 240 may be coupled to the fiber-reinforced layer 130 and the reinforcement ring 230 to serve to connect the fiber-reinforced layer 130 and the reinforcement ring 230. The outer sleeve 240 may be made of a metal material, but the present disclosure is not limited thereto. Like the inner sleeve 220, the outer sleeve 240 may be pressed against the outer surface of the fiber-reinforced layer 130 by the swaging method.

When the outer sleeve 240 is coupled to the outer surface of the fiber-reinforced layer 130 by the swaging method, the reinforcement ring 230 and the fiber-reinforced layer 130 may be firmly fixed, and accordingly, the load transferred from the nipple 210 may be transferred to the fiber-reinforced layer 130 and the outer sleeve 240 through the reinforcement ring 230.

In detail, the reinforcement ring 230 may include a sleeve coupling groove 233 concavely formed on an outer circumferential surface thereof. Further, the outer sleeve 240 may include an outer coupling step 242 protruding to be inserted into the sleeve coupling groove 233 at an end thereof in the first direction.

When the outer sleeve 240 is coupled to the outer surface of the fiber-reinforced layer 130, the outer coupling step 242 of the outer sleeve 240 is inserted into the sleeve coupling groove 233 of the reinforcement ring 230, and thus the outer sleeve 240 and the reinforcement ring 230 may be coupled to each other. Accordingly, the reinforcement ring 230 and the fiber-reinforced layer 130 may be firmly coupled to each other.

Meanwhile, the outer sleeve 240 may include a plurality of the fixing protrusions 243 protruding from an inner surface thereof to be fixed to the fiber-reinforced layer 130, and a fluid hole 245 through which the fluid flowing in the fiber-reinforced layer 130 is introduced or discharged and which communicates with the flow path groove 222.

For example, the plurality of fixing protrusions 243 may be formed to locally protrude from the inner surface of the outer sleeve 240. That is, the fixing protrusion 243 may not be continuously formed on an inner circumferential surface of the outer sleeve 240 in a circumferential direction, but may protrude intermittently and locally. This is because, when the fixing protrusion 243 is continuously formed along an inner circumference of the outer sleeve 240, the fiber-reinforced layer 130 is pressed, and thus the injected resin may be difficult to move. In this case, an area that is not impregnated with the resin may be generated in the fiber-reinforced layer 130.

Accordingly, the fixing protrusion 243 is formed to locally protrude from the inner surface of the outer sleeve 240, and thus a portion from which the fixing protrusion 243 protrudes may serve to support the load applied in the extension direction (the first direction or the second direction) of the fiber-reinforced layer 130 by being pressed against the outer surface of the fiber-reinforced layer 130. Further, a portion of the inner surface of the outer sleeve 240, in which the fixing protrusion 243 is not formed, may be provided to press the fiber-reinforced layer 130 relatively less, and accordingly, the portion in which the fixing protrusion 243 is not formed may serve as a flow path through which the resin injected into the fiber-reinforced layer 130 moves.

The plurality of fixing protrusions 243 may be formed in various shapes as long as the fixing protrusions 243 may be fixed to the fiber-reinforced layer 130, and at the same time, the resin may smoothly move. For example, referring to FIG. 14, the plurality of fixing protrusions 243 may include a first group of fixing protrusions 243 arranged in the extension direction of the liner 110, and the first group of fixing protrusions 243 may be arranged spaced apart from each other in a circumferential direction of the outer sleeve 240.

Accordingly, a resin movement flow path 244, through which the resin may mainly move, may be implemented on the inner surface of the outer sleeve 240 by a portion from which the first group of fixing protrusions 243 do not protrude. A flow path formed between the first group of fixing protrusions 243 may extend in the extension direction (the first direction or the second direction) of the fiber-reinforced layer 130. Further, it is apparent that the resin may also move between the plurality of fixing protrusions 243 constituting the first group of fixing protrusions 243.

In this way, as the fixing protrusion 243 is formed inside the outer sleeve 240, a fixing force for the fiber-reinforced layer 130 increases. Thus, the load applied to the nozzle part 200 may be stably supported by the internal pressure of the liner 110, and at the same time, the flow path through which the resin moves is implemented in the portion in which the fixing protrusion 243 is not formed, so that the impregnation of the fiber-reinforced layer 130 with the resin may increase. Accordingly, structural performance of the portion in which the vessel part 100 and the nozzle part 200 are connected may be improved.

Meanwhile, when the fiber-reinforced layer 130 is impregnated with the resin, the resin may be injected or discharged through the fluid hole 245 formed in the outer sleeve 240. For example, FIGS. 19 and 20 illustrate an example in which the resin is discharged through the fluid hole 245. After the resin injected at any point of the fiber-reinforced layer 130 moves in the first direction or the second direction and is impregnated between the reinforced fibers, the resin that is not impregnated may be discharged through the fluid hole 245.

An inner circumferential surface of the fluid hole 245 may be formed in a simple hole shape or a threaded hole shape.

For example, a screw thread may be formed on the inner circumferential surface of the fluid hole 245, and in this case, a fitting for injecting the resin may be directly screw-fastened. When the fitting is directly screw-coupled to the fluid hole 245, a pressure in addition to the vacuum pressure applied to the fiber-reinforced layer 130 may be additionally applied to the fiber-reinforced layer 130 during the screw coupling. Thus, this case may be effective when a resin having low impregnation is used.

Meanwhile, the nozzle part 200 may further include a surface treatment layer, which is surface-treated, on an outer surface of the inner sleeve 220 and the inner surface of the outer sleeve 240 to improve an adhesive force for the fluid impregnated in the fiber-reinforced layer 130. The surface treatment is a finishing method performed on a surface of a metal to have various functions such as prevention of corrosion of metal and an increase in adhesion.

In the first embodiment of the present disclosure, the outer surface of the inner sleeve 220 and the inner surface of the outer sleeve 240, which are in contact with the fiber-reinforced layer 130, are separately surface-treated, so that adhesion for the resin may be improved when the fiber-reinforced layer 130 is impregnate with the resin. Accordingly, a load transferred between the fiber-reinforced layer 130 and the inner sleeve 220 or between the fiber-reinforced layer 130 and the outer sleeve 240 may be transferred to a wider area, and accordingly, the present disclosure may additionally secure structural stability.

Meanwhile, the nozzle part 200 may further include a reinforcement sleeve 250 surrounding the outer surfaces of the outer sleeve 240 and the fiber-reinforced layer 130. For example, the reinforcement sleeve 250 may be formed on the outermost portion of the nozzle part 200 by the swaging method after the fiber-reinforced layer 130 is cured. That is, the reinforcement sleeve 250 may be pressed on the outer surfaces of the outer sleeve 240 and the fiber-reinforced layer 130 by the swaging method.

In this case, after the resin with which the fiber-reinforced layer 130 is impregnated is cured and the rigidity of the fiber-reinforced layer 130 is secured, the reinforcement sleeve 250 is swaged, and thus deformation of the sealing member 219 may be minimized.

Meanwhile, hereinafter, a load transfer path of the pressure vessel 10 according to the first embodiment of the present disclosure will be described with reference to FIG. 21.

First, when a pressure is applied to the inside of the liner 110 by a high-pressure fuel, the load may be applied in the extension direction (the first direction) of the nipple 210 by the pressure. Since the nipple 210 is coupled to the liner 110 and the inner sleeve 220, the load applied to the nipple 210 may be transferred to the liner 110 and the inner sleeve 220.

Further, since the nipple 210 is coupled to the reinforcement ring 230 and the outer sleeve 240, the load applied to the nipple 210 in the extension direction may be transferred to the outer sleeve 240 through the reinforcement ring 230. The load applied to the outer sleeve 240 may be transferred to the fiber-reinforced layer 130 by the fixing protrusion 243 formed in the outer sleeve 240.

As a result, the load applied to the liner 110 in the extension direction is supported in an entire structure constituting the vessel part 100 and the nozzle part 200. Due to this structure, structural rigidity may increase at a connection portion between the vessel part 100 and the nozzle part 200. An arrow illustrated in FIG. 21 indicates the load transfer path.

Figure 22:
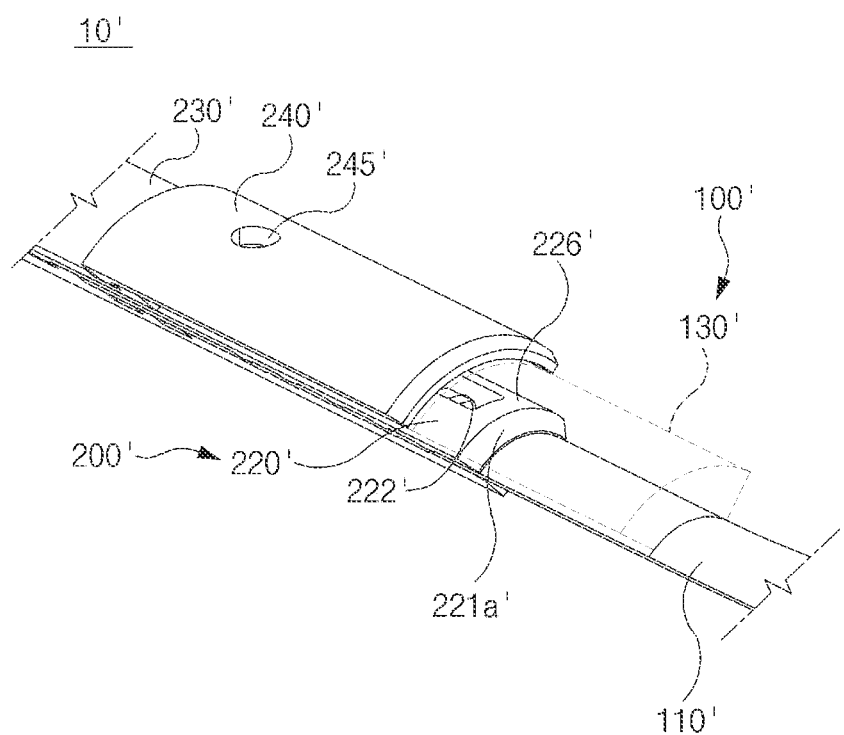
FIG. 22 is a partial cross-sectional perspective view illustrating a pressure vessel according to a second embodiment of the present disclosure.

Meanwhile, hereinafter, a pressure vessel 10' according to a second embodiment of the present disclosure will be described with reference to FIGS. 22 to 24. FIG. 22 is a partial cross-sectional perspective view illustrating a pressure vessel according to a second embodiment of the present disclosure, FIG. 23 is a cross-sectional view illustrating a cross section of the pressure vessel according to the second embodiment of the present disclosure, and FIG. 24 is a partially enlarged perspective view illustrating a part of the pressure vessel according to the second embodiment of the present disclosure and is a view for describing a position of a flow path groove and a fixing protrusion.

Figure 23:
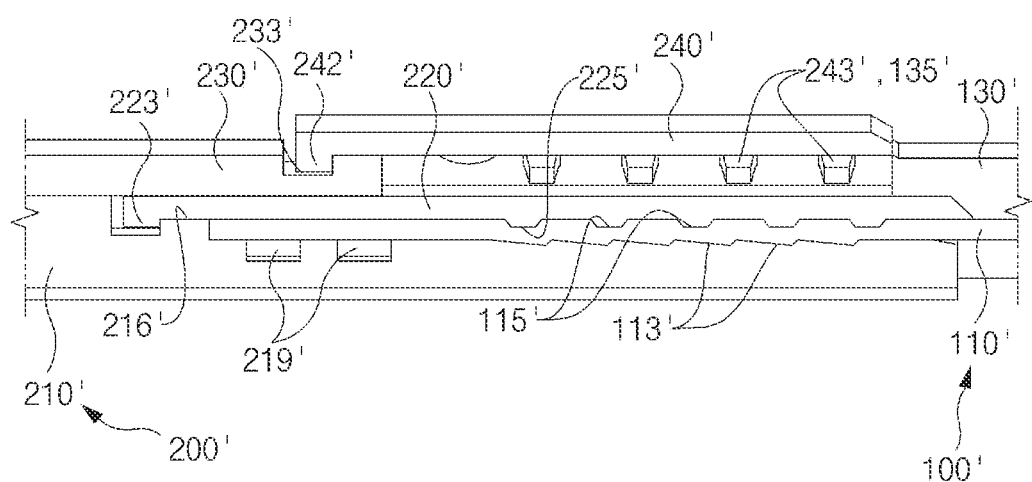
FIG. 23 is a cross-sectional view illustrating a cross section of the pressure vessel according to the second embodiment of the present disclosure.
Figure 24:
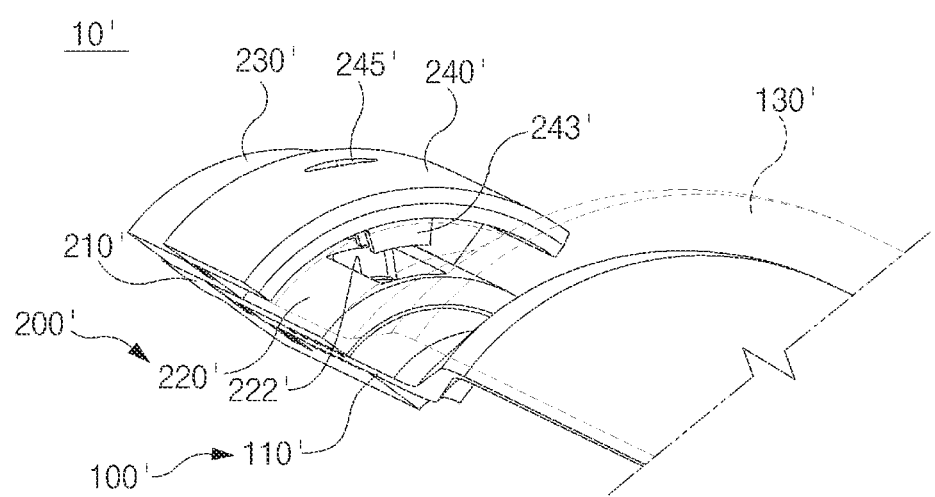
FIG. 24 is a partially enlarged perspective view illustrating a part of the pressure vessel according to the second embodiment of the present disclosure and is a view for describing a position of a flow path groove and a fixing protrusion.

The second embodiment of the present disclosure illustrated in FIGS. 22 to 24 differs from the above-described first embodiment in terms of the shape of the inner sleeve and the position of the sealing member. Thus, the second embodiment of the present disclosure may include all the first embodiment of the present disclosure except for the above-described differences. Further, it is apparent that an embodiment obtained by including the second embodiment in the first embodiment is also possible. Hereinafter, a duplicated description of the same components as those of the first embodiment will be omitted.

The pressure vessel 10' according to the second embodiment of the present disclosure includes a vessel part 100' including a liner 110' and a fiber-reinforced layer 130' formed to surround an outer surface of the liner 110' and a nozzle part 200' provided at an end of the vessel part 100'. The nozzle part 200' includes a nipple 210' inserted into the liner 110' and an inner sleeve 220' inserted between the outer surface of the liner 110' and an inner surface of the fiber-reinforced layer 130' and having a flow path groove 222' extending in an extension direction of the liner 110'.

The pressure vessel 10' according to the embodiment of the present disclosure may include the vessel part 100' in which a high-pressure fluid is stored and the nozzle part 200' connected to both ends of the vessel part 100' to inject or discharge the fluid into or from the vessel part 100'.

The vessel part 100' includes the liner 110' and the fiber-reinforced layer 130'.

A nipple fixing groove 113' for fixing the nipple 210' may be formed on an inner surface of the liner 110', and a sleeve fixing groove 115' for fixing the inner sleeve 220' may be formed on the outer surface of the liner 110'.

The nozzle part 200' may further include a reinforcement ring 230' and an outer sleeve 240'. Further, the reinforcement ring 230' may include a sleeve coupling groove 233' concavely formed on an outer circumferential surface thereof, and the outer sleeve 240' may include an outer coupling step 242' protruding to be inserted into the sleeve coupling groove 233' at an end thereof in the first direction.

The outer sleeve 240' may include a plurality of the fixing protrusions 243' protruding from an inner surface thereof to be fixed to the fiber-reinforced layer 130, and a fluid hole 245' formed to communicate with the flow path groove 222'.

For example, the plurality of fixing protrusions 243' may include a first group of fixing protrusions 243' arranged in the extension direction of the liner 110', and the first group of fixing protrusions 243' may be arranged spaced apart from each other in a circumferential direction of the outer sleeve 240'.

Further, referring to FIG. 24, a resin movement flow path is provided between the first group of fixing protrusions 243' adjacent to each other, and the resin movement flow path and the flow path groove 222' may be alternately positioned in the circumferential direction of the outer sleeve 240'.

In detail, on a cross section perpendicular to the liner 110', the resin movement flow path (a portion in which the fixing protrusion 243' is not formed) of the outer sleeve 240' and the flow path groove 222' of the inner sleeve 220' may be arranged in a zigzag pattern while alternating with each other. Further, the fixing protrusion 243' and the flow path groove 222' may be formed to face each other.

Accordingly, when the resin flows through the fiber-reinforced layer 130', the resin may move through the flow path groove 222' at a portion of the outer sleeve 240' in which the fixing protrusion 243' is formed. Accordingly, disturbance of the movement of the resin may be minimized by the fixing protrusion 243', so that the impregnability of the resin may increase.

Meanwhile, referring to FIG. 22, the flow path groove 222' may pass through an inner surface and an outer surface of the inner sleeve 220', and a tip portion 226' that is an end of the inner sleeve 220' in the second direction may be continuously formed in a circumferential direction to close an end of the flow path groove 222' in the second direction.

In the above-described first embodiment of the present disclosure, the end of the flow path groove 222 has an open structure, but in the second embodiment of the present disclosure, the end of the flow path groove 222' in the second direction may have a closed structure. In the second embodiment of the present disclosure, since the tip portion 226' of the inner sleeve 220' is maintained in a continuous ring shape in a circumferential direction of the liner 110', lifting of an end 221a' of the inner sleeve 220' may be minimized during the swaging process, and accordingly, a state in which the end 221a' of the inner sleeve 220' may be maintained in close contact with the liner 110'.

As in the first embodiment of the present disclosure, when the end of the flow path groove 222 in the second direction is open, a passage through which the resin flows into the flow path groove 222 is secured so that the impregnation of the resin may increase. However, in the second embodiment of the present disclosure, since the end of the flow path groove 222' in the second direction is closed, and thus the fluidity of the resin may be degraded.

Referring to FIGS. 22 and 23, to solve this problem, the end 221a' of the inner sleeve 220' may extend further than an end of the outer sleeve 240' in the second direction. Further, the end of the flow path groove 222' in the second direction may be positioned further in the second direction than the end of the outer sleeve 240' in the second direction.

In detail, the tip portion 226' of the inner sleeve 220' further extends in the second direction, the end of the flow path groove 222' in the second direction is positioned further in the second direction than the end of the outer sleeve 240', and thus the resin flowing through the fiber-reinforced layer 130' may smoothly move to the flow path groove 222'. Accordingly, even when the end of the flow path groove 222' is blocked, a structure advantageous for moving the resin to the flow path groove 222' may be secured, and accordingly, the impregnation of the fiber-reinforced layer 130' with the resin may further increase.

Meanwhile, referring to FIG. 23, the nozzle part 200' may further include a sealing member 219' that seals a gap between the nipple 210' and the liner 110', and the sealing member 219' may be provided at a position corresponding to an end of the liner 110' in the first direction.

In more detail, the sealing member 219' may be provided at a position corresponding to the end of the outer sleeve 240' in the first direction.

Accordingly, a sealing force between the liner 110' and the nipple 210' by the sealing member 219' may increase. In detail, at the end of the liner 110' in the first direction, an end of the reinforcement ring 230', the end of the outer sleeve 240', and the end of the inner sleeve 220' overlap and are bound to each other. For example, the outer coupling step 242' of the sealing member 219' may protrude inward from the outside in a radial direction and perform pressing for coupling with the reinforcement ring 230'. The gap between the nipple 210' and the liner 110' may be pressed by this pressing force, and in this case, the sealing member 219' may be pressed, thereby increasing a sealing force.

In FIGS. 22 and 23, reference numeral 223' that is not described denotes an inner coupling step, and reference numeral 216' that is not described denotes a coupling protrusion part.

Meanwhile, hereinafter, a method of manufacturing the pressure vessel 10 according to the first embodiment of the present disclosure will be described with reference to FIGS. 17 to 20. The method of manufacturing the pressure vessel 10 according to the present disclosure is a method of manufacturing the above pressure vessel 10, and a duplicated description of the same configuration will be omitted.

The method of manufacturing the pressure vessel 10 according to the present disclosure may include a nipple mounting operation S110, an inner sleeve fixing operation S120, a hold pressure application operation S130, a fiber-reinforced layer formation operation S140, a resin impregnation operation S170, and a curing operation S180. Further, the method of manufacturing the pressure vessel 10 according to the present disclosure may further include a reinforcement ring mounting operation S150 and an outer sleeve fixing operation S160 before the resin impregnation operation S170.

The nipple mounting operation S110 is an operation of inserting the nipple 210 into the liner 110. In this case, the nipple protrusion 217 of the nipple 210 may be inserted into the nipple fixing groove 113 of the liner 110.

The inner sleeve fixing operation S120 is an operation of fixing the inner sleeve 220 to the outer surface of the liner 110 by a swaging process. In this case, the sleeve protrusion 225 of the inner sleeve 220 may be inserted into the sleeve fixing groove 115 of the liner 110. Further, the inner coupling step 223 of the inner sleeve 220 may be inserted into the coupling protrusion part 216 of the nipple 210 (see FIG. 18A).

The hold pressure application operation S130 is an operation of applying a hold pressure to the inside of the liner 110. For example, the hold pressure may be applied by applying an air pressure to the inside of the liner 110. In this case, since the liner 110 and the nipple 210 are firmly fixed by the inner sleeve 220, the inner sleeve 220 may support the liner 110 and the nipple 210 in a process of providing the hold pressure.

The fiber-reinforced layer formation operation S140 is an operation of forming the fiber-reinforced layer 130 by braiding the reinforced fiber on the outer surface of the liner 110 in a state in which the hold pressure is applied to the inside of the liner 110 (see FIG. 18B).

In the fiber-reinforced layer formation operation S140, the fiber-reinforced layer 130 may be formed by braiding the reinforced fiber on the outer surface of the liner 110. In this case, in the hold pressure application operation S130, deformation of the liner 110 may be minimized by the hold pressure applied to the inside of the liner 110 in advance.

After the fiber-reinforced layer formation operation S140, a gap may be generated between the fiber-reinforced layer 130 and the liner 110 by the flow path groove 222 of the inner sleeve 220, and the gap may be a flow path through which the resin that is injected thereafter moves.

The reinforcement ring mounting operation S150 is an operation of screw-coupling the reinforcement ring 230 to the outer surface of the nipple 210 (see FIG. 18C). The nipple 210 and the reinforcement ring 230 may be screw-coupled by the outer screw thread 213 of the nipple 210 and the screw thread formed on the inner circumferential surface of the reinforcement ring 230.

The outer sleeve fixing operation S160 is an operation of fixing the outer sleeve 240 to the outer surface of the fiber-reinforced layer 130 and the outer surface of the reinforcement ring 230 by the swaging operation (see FIG. 18D). In the outer sleeve fixing operation S160, the outer coupling step 242 of the outer sleeve 240 may be coupled to the sleeve coupling groove 233 of the reinforcement ring 230, and the fixing protrusion 243 of the outer sleeve 240 may be fixed to the fiber-reinforced layer 130.

The resin impregnation operation S170 is an operation of impregnating the fiber-reinforced layer 130 with the resin (see FIGS. 19 and 20). In a state in which the inner sleeve 220 is formed inside the fiber-reinforced layer 130 and the outer sleeve 240 is formed outside the fiber-reinforced layer 130, the resin may be injected into the fiber-reinforced layer 130. In this case, a vacuum state is formed in the fiber-reinforced layer 130, and thus a gap between the reinforced fibers may be impregnated with the injected resin.

In the resin impregnation operation S170, at least a portion of the resin impregnated through the flow path groove 222 provided in the inner sleeve 220 may be provided to move in the extension direction of the liner 110. Further, the resin may smoothly move through an area of the outer sleeve 240 in which the fixing protrusion 243 is not formed. Arrow directions in FIGS. 19 and 20 indicate paths in which the injected resin moves. However, the movement path of the resin is not limited thereto, and the resin may move in a direction opposite thereto.

In this way, a flow path through which the resin may move may be formed inside and outside the fiber-reinforced layer 130 by the inner sleeve 220 and the outer sleeve 240, and accordingly, the impregnation of the resin may increase. In this way, in the present disclosure, since a structure in which the resin is advantageously impregnated is formed, the fiber-reinforced layer 130 is smoothly impregnated with the resin, and thus the cured fiber-reinforced layer 130 may secure static strength and fatigue strength. Thus, according to the present disclosure, structural performance of the fiber-reinforced layer 130 may be improved.

In the resin impregnation operation S170, the resin flowing through the fiber-reinforced layer 130 may be discharged through the fluid hole 245 formed in the outer sleeve 240. That is, a portion of the resin which is injected into the fiber-reinforced layer 130 and is not impregnated in the fiber-reinforced layer 130 may be discharged through the fluid hole 245.

In the curing operation S180 is an operation of curing the impregnated resin. Only when the resin with which the fiber-reinforced layer 130 is impregnated is finally cured, the fiber-reinforced layer 130 may be completed.

The method may further include a reinforcement sleeve fixing operation after the curing operation S180. The reinforcement sleeve fixing operation is an operation of coupling the reinforcement sleeve 250 to the outsides of the cured fiber-reinforced layer 130 and the outer sleeve 240 by the swaging method. After the resin with which the fiber-reinforced layer 130 is impregnated is cured and the rigidity of the fiber-reinforced layer 130 is secured, the reinforcement sleeve 250 is swaged, and thus deformation of the sealing member 219 may be minimized.

In this way, according to the embodiment of the present disclosure, a flow path through which the resin moves is formed in the inner sleeve and the outer sleeve formed inside and outside the fiber-reinforced layer, and thus the impregnation of the fiber-reinforced layer with the resin may increase.

According to the embodiment of the present disclosure, as the impregnation of the fiber-reinforced layer with the resin increases, the static strength and the fatigue strength of the fiber-reinforced layer may be secured, and accordingly, the structural performance of the pressure vessel may be improved.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

The invention claimed is:

1. A pressure vessel comprising:
a vessel part including a liner and a fiber-reinforced layer surrounding an outer surface of the liner; and
a nozzle part positioned at an end of the vessel part,
wherein the nozzle part includes:
a nipple having at least a portion inserted into the liner; and
an inner sleeve inserted between the outer surface of the liner and an inner surface of the fiber-reinforced layer, the inner sleeve having a flow path groove extending in an extension direction of the liner;
wherein a direction toward the end to which the nozzle part is connected is a first direction and a direction opposite to the first direction is a second direction, among an extension direction of the vessel part, and
wherein the nipple includes an insertion fitting part inserted into the vessel part;
wherein the insertion fitting part includes a coupling protrusion part protruding from an outer surface of an end of the insertion fitting part in the first direction;
wherein the inner sleeve includes an inner coupling step coupled to the coupling protrusion part;
wherein the liner includes a sleeve fixing groove concavely formed on the outer surface of the liner; and
wherein the inner sleeve includes a sleeve protrusion protruding from an inner surface of the inner sleeve and inserted into the sleeve fixing groove.

2. The pressure vessel of claim 1, wherein the nipple further includes:
a pipe connection part extending from the insertion fitting part in the first direction and protruding from the end of the vessel part.

3. The pressure vessel of claim 2, wherein the liner includes a nipple fixing groove concavely formed on an inner surface of the liner, and
the insertion fitting part includes a nipple protrusion configured to be inserted into the nipple fixing groove on an outer surface of the insertion fitting part.

4. The pressure vessel of claim 2, wherein the pipe connection part has an inner circumferential surface having an inner screw thread, and an outer circumferential surface having an outer screw thread.

5. The pressure vessel of claim 1, wherein the flow path groove passes through an inner surface and an outer surface of the inner sleeve and is open at an end of the inner sleeve in the second direction.

6. The pressure vessel of claim 5, wherein the nozzle part further includes a sealing member configured to seal a gap between the nipple and the liner, and wherein
the nipple further includes:
a pipe connection part extending from the insertion fitting part in the first direction and protruding from the end of the vessel part;
wherein the insertion fitting part includes a swaging area corresponding to the inner sleeve and a non-swaging area provided in the second direction of the swaging area; and
wherein a sealing mounting groove into which the sealing member is inserted is formed in the non-swaging area.

7. A pressure vessel comprising:
a vessel part including a liner and a fiber-reinforced layer surrounding an outer surface of the liner; and
a nozzle part positioned at an end of the vessel part;
wherein the nozzle part includes:
a nipple having at least a portion inserted into the liner; and
an inner sleeve inserted between the outer surface of the liner and an inner surface of the fiber-reinforced layer, the inner sleeve having a flow path groove extending in an extension direction of the liner;
wherein a direction toward an end to which the nozzle part is connected is a first direction and a direction opposite to the first direction is a second direction, among an extension direction of the vessel part, and wherein the nipple includes:
an insertion fitting part inserted into the vessel part; and
a pipe connection part extending from the insertion fitting part in the first direction and protruding from the end of the vessel part; and
wherein the nozzle part further includes:
a reinforcement ring screw coupled to an end of the nipple in the first direction; and
an outer sleeve surrounding an outer surface of the fiber-reinforced layer, and coupled to an outer surface of the reinforcement ring, wherein the reinforcement ring includes a sleeve coupling groove concavely formed on an outer circumferential surface of the reinforcement ring, and
the outer sleeve includes an outer coupling step configured to be inserted into the sleeve coupling groove at an end of the outer sleeve in the first direction.

8. The pressure vessel of claim 7, wherein the outer sleeve includes:
a plurality of fixing protrusions protruding from an inner surface of the outer sleeve configured to be fixed to the fiber-reinforced layer; and
a fluid hole through which a fluid flowing in the fiber-reinforced layer is introduced or discharged, the fluid hole being configured to communicate with the flow path groove.

9. The pressure vessel of claim 8, wherein the plurality of fixing protrusions include a first group of fixing protrusions arranged in an extension direction of the liner, and the first group of the fixing protrusions are arranged spaced apart from each other in a circumferential direction of the outer sleeve, wherein a resin movement flow path is provided between the first group of fixing protrusions adjacent to each other, and
the resin movement flow path and the flow path groove are alternately positioned in the circumferential direction of the outer sleeve.

10. The pressure vessel of claim 8, wherein the fluid hole has a screw thread formed on an inner circumferential surface of the fluid hole.

11. The pressure vessel of claim 7, wherein the nozzle part further includes a surface treatment layer, which is surface-treated, on an outer surface of the inner sleeve, and on an inner surface of the outer sleeve configured to improve an adhesive force for the fluid impregnated in the fiber-reinforced layer.

12. The pressure vessel of claim 7, wherein the nozzle part further includes a reinforcement sleeve surrounding the outer surfaces of the outer sleeve and the fiber-reinforced layer.

13. A pressure vessel comprising:
a vessel part including a liner and a fiber-reinforced layer surrounding an outer surface of the liner; and
a nozzle part positioned at an end of the vessel part;
wherein the nozzle part includes:
a nipple having at least a portion inserted into the liner; and
an inner sleeve inserted between the outer surface of the liner and an inner surface of the fiber-reinforced layer, the inner sleeve having a flow path groove extending in an extension direction of the liner;
wherein a direction toward an end to which the nozzle part is connected is a first direction and a direction opposite to the first direction is a second direction, among an extension direction of the vessel part, and wherein the flow path groove passes through an inner surface and an outer surface of the inner sleeve, and
a tip portion that is an end of the inner sleeve in the second direction is continuously formed in a circumferential direction to close an end of the flow path groove in the second direction.

14. The pressure vessel of claim 13, wherein the nozzle part further includes an outer sleeve surrounding an outer surface of the fiber-reinforced layer,
an end of the inner sleeve extends further than an end of the outer sleeve in the second direction, and
the end of the flow path groove in the second direction is located at a position further in the second direction than the end of the outer sleeve in the second direction.

15. The pressure vessel of claim 14, wherein the nozzle part further includes a sealing member configured to seal a gap between the nipple and the liner, and
the sealing member is provided at a position corresponding to an end of the liner in the first direction and is provided at a position corresponding to an end of the outer sleeve in the first direction.

* * * * *